United States Patent [19]
Zoller

[11] Patent Number: 5,350,608
[45] Date of Patent: Sep. 27, 1994

[54] DECORATIVE TRIM WITH ONE-PIECE PLASTIC COVER

[75] Inventor: Robert A. Zoller, Bay Village, Ohio

[73] Assignee: The Standard Products Company, Cleveland, Ohio

[21] Appl. No.: 47,260

[22] Filed: Apr. 13, 1993

[51] Int. Cl.$^5$ .............................................. B32B 9/00
[52] U.S. Cl. ...................................... 428/31; 428/60; 428/99; 428/121; 428/124; 428/130; 428/164; 428/172; 428/192; 428/195; 293/1; 293/128; 52/716.5; 52/716.6; 52/718.05
[58] Field of Search ................... 428/31, 99, 195, 192, 428/164, 121, 124, 195, 172, 487, 130, 60; 293/1, 128; 52/716, 717.1, 718.1

[56] References Cited

U.S. PATENT DOCUMENTS

| | | | |
|---|---|---|---|
| 3,471,979 | 10/1969 | Herr | 52/100 |
| 3,590,768 | 7/1971 | Shannek et al. | 52/311 |
| 3,616,099 | 10/1971 | Victor et al. | 428/31 |
| 3,752,521 | 8/1973 | Lefebre | 293/1 |
| 3,914,482 | 10/1975 | Sawa et al. | 428/31 |
| 3,922,460 | 11/1975 | Jackson | 428/217 |
| 4,066,285 | 1/1978 | Hall et al. | 293/62 |
| 4,094,056 | 1/1978 | Takeda et al. | 428/31 |
| 4,291,076 | 9/1981 | Katoh | 428/217 |
| 4,363,839 | 12/1982 | Watanabe et al. | 428/463 |
| 4,397,896 | 8/1983 | Moran | 428/31 |
| 4,463,539 | 8/1984 | Simon | 52/717 |
| 4,546,021 | 10/1985 | Mears | 428/31 |
| 4,548,843 | 10/1985 | Kozukawa et al. | 428/31 |
| 4,560,596 | 12/1985 | Coscia | 428/31 |
| 4,566,929 | 1/1986 | Waugh | 428/31 |
| 4,617,209 | 10/1986 | Ives | 428/31 |
| 5,108,801 | 4/1992 | Takahashi | 428/31 |

Primary Examiner—Patrick J. Ryan
Assistant Examiner—Abraham Bahta
Attorney, Agent, or Firm—Harness, Dickey & Pierce

[57] ABSTRACT

A trim strip for attachment to a substrate such as a vehicle includes a metallic core member and a one-piece outer layer which includes injection molded plastic inserts. In addition, a method of making the trim strip includes the steps of bonding an outer layer to the core member wherein the outer layer extends beyond the longitudinal ends of the core member, injection molding plastic inserts which bond to the outer layer, and forming the outer layer over the ends of the core member, thereby forming end caps over the metallic core.

14 Claims, 2 Drawing Sheets

DECORATIVE TRIM WITH ONE-PIECE PLASTIC COVER

TECHNICAL FIELD

The subject invention relates to trim strips having a one-piece plastic cover for attachment to a vehicle, and their method of making. More particularly, this invention relates to decorative trim strips having a metallic core and a one-piece plastic cover including injection molded plastic inserts with retaining fasteners.

BACKGROUND OF THE INVENTION

Trim strips are frequently used as protective and decorative accessories for motor vehicles, boats, aircraft, appliances, machines and other structures. For example, trim strips can be employed as body side molding on automobiles to provide impact protection from door strikes and also to enhance the aesthetic appeal of the automobile. Trim strips are generally formed by extruding thermoplastic material into elongated moldings which are then transversely cut to desired lengths. Considerable effort is often used to enhance the appearance of trim strips by, for example, providing an attractive end finishing or laminating a metallized film thereon.

In the past, trim strips for attachment to a vehicle have encountered various problems due to the design and manufacture of the trim strips. For instance, trim strips which are formed by extruding a thermoplastic material over a solid metal core to form an outer layer of skin about the metal core have imperfections in the outer skin. Such imperfections typically include ridges or "chatter lines" which appear in the outer skin due to vibrations which occur in the metal core during the extrusion process.

A further problem with traditional trim strips is that the end caps of the trim have to be molded to the ends of the trim, usually using a material different than the material utilized for the outer skin of the trim strip. This results in a joint line formed between the end cap and the outer skin of the trim strip as well as color mismatch between the end caps and the outer skin.

A further problem is that molded end caps are difficult to bond securely to the end portion of the trim strip with the required joint bond strength. This has resulted in a poor end cap joint strength which in turn has resulted in a large scrap rate of such trim strips. There thus remains a need for an improved trim strip and method of making such trim strips.

SUMMARY OF THE INVENTION

Accordingly, the present invention relates to improved methods for forming trim strips having finished ends and to the products made by such methods. The present invention provides a trim strip having a smooth continuous surface and terminal ends which are well secured to the remaining trim strip portion.

In particular, a decorative trim strip for attachment to automotive vehicles is provided and includes a metallic core and an outer plastic skin bonded about one side of the metallic core. The outer plastic skin typically extends beyond the ends of the metallic core to facilitate injection molding plastic inserts to the end portions of the outer plastic skin within a mold. The plastic skin is formed over the ends of the metallic core during the molding step, thereby forming end caps. Fasteners are typically attached to the plastic inserts during the molding step to allow for attachment of the trim strip to the automotive vehicle.

An advantage of the present invention is that the one-piece plastic cover prevents joint lines from appearing.

Another advantage of the present invention is that by utilizing injection molded plastic inserts covered by an outer plastic skin, end caps are securely formed.

Yet another advantage of the present invention is that color mismatch problems are eliminated since the outer plastic skin forms the outer surface of the end caps.

Still another advantage is that by utilizing an outer plastic skin which is substantially preformed and then bonded to the metallic core member, ridges or "chatter lines" are eliminated.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE INVENTION

Figure 1:
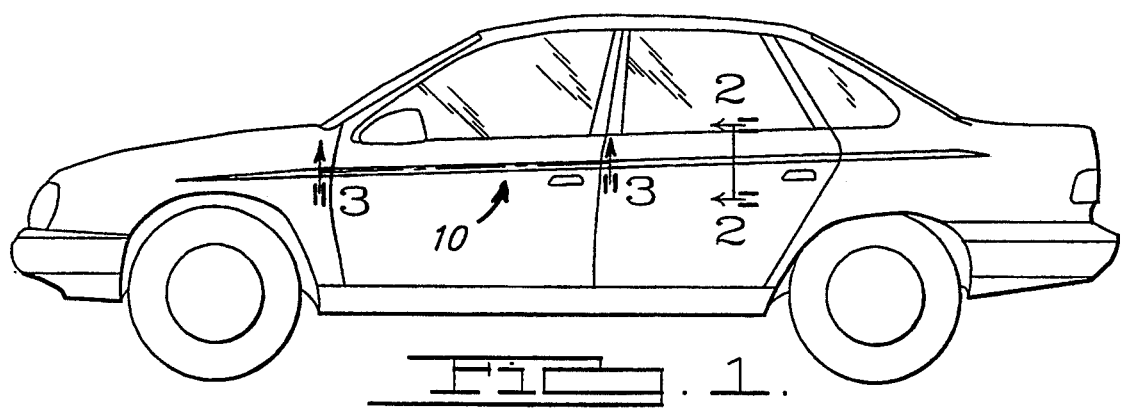
FIG. 1 is a side view of a vehicle with an attached decorative trim strip according to the teachings of the present invention.

A trim strip of the present invention as attached to a vehicle is generally shown by reference numeral 10 in FIG. 1. While the trim strip 10 is preferably utilized as a decorative fixture which is selectively attachable to automotive vehicles it should be understood by those skilled in the art that the trim strip has many other applications.

Figure 2:
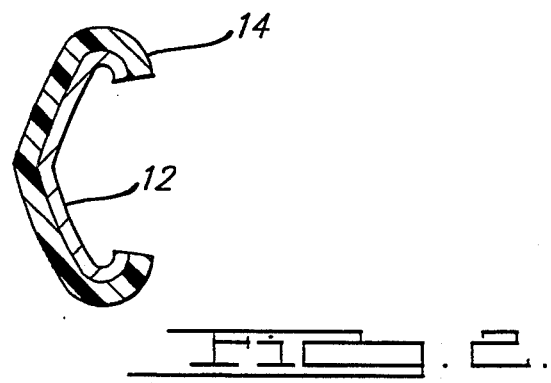
FIG. 2 is a cross-sectional view of the metallic core and plastic skin subassembly taken along line 2—2.
Figure 3:
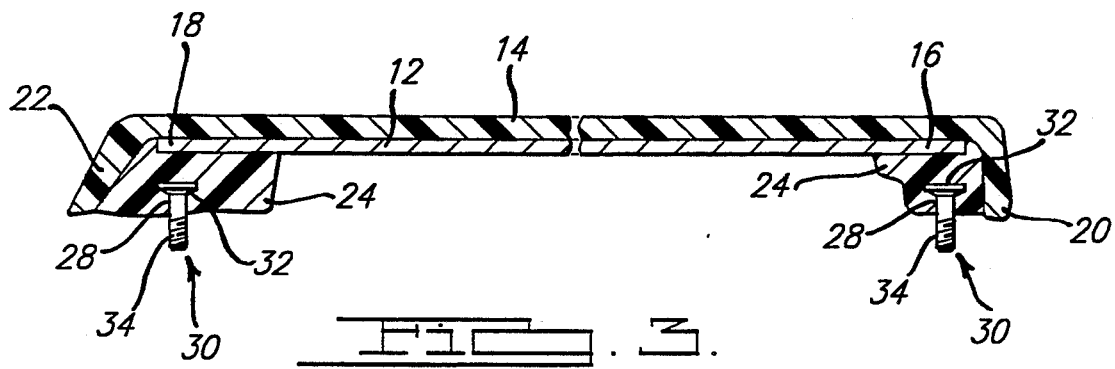
FIG. 3 is a partial cross-sectional view of the decorative trim strip taken along line 3—3.

As shown in FIGS. 2 and 3, the trim strip 10 includes a core member 12 and a plastic outer skin 14. The core member 12 has a predetermined configuration such as a C-shape in cross-section as shown in FIG. 2. Most preferably the core member 12 is made of roll formed stainless steel or another resilient metal such as aluminum. The core member 12 is typically coated with primer which facilitates subsequent bonding of the plastic outer skin 14 to at least one side of the core member 12.

The plastic outer skin of the trim strip is formed of a thermoplastic material by conventional film/sheet processing techniques and is cut to a predetermined length, sufficiently long so that the ends 20 and 22, respectively, of the plastic outer skin 14 will extend beyond the ends 16 and 18, respectively of core member 12. The trim strip 10 also includes plastic inserts 24 and 26 which are formed along sections of the trim strip and preferably are disposed along each end of the trim strip 10. The plastic inserts 24 and 26 are formed by placing the plastic skin and core member subassembly in an injection mold (not shown) wherein the plastic inserts 24 and 26 are injection molded at both ends of the plastic outer skin 14. The ends 20 and 22 of the plastic skin 14 are then formed over the metallic core ends 16 and 18 thereby forming a continuous surface.

Fasteners are generally used to attach the trim strip 10 to the desired substrate. Preferably, the fasteners 30 which typically include a head portion 32 and a shaft portion 34 are positioned within the mold cavity prior to adding the metallic core and plastic outer subassembly therein. As the injection molding process is carried out the injection molding material which forms the plastic inserts 24 and 26 flows around the head portion 32 of the fasteners to partially embed the fasteners 30. By partially embedding the fasteners during formation of plastic inserts, the fasteners become permanently secured to the trim strip. Under certain applications such as when the fasteners and inserts are made of dissimilar materials it may also be desirable to coat the fasteners with a primer to further facilitate bonding between the fasteners and the inserts.

Optionally, the plastic inserts 24 and 26 can be provided with apertures 28 or alternatively grooves (not shown) for the attachment of fasteners 30 after the trim strip has been provided with the plastic inserts. The fasteners 30 may be disposed through the plastic inserts 24 and 26 while the trim strip 10 is still in the mold or attached after the trim strip has been removed from the mold.

Figure 4:
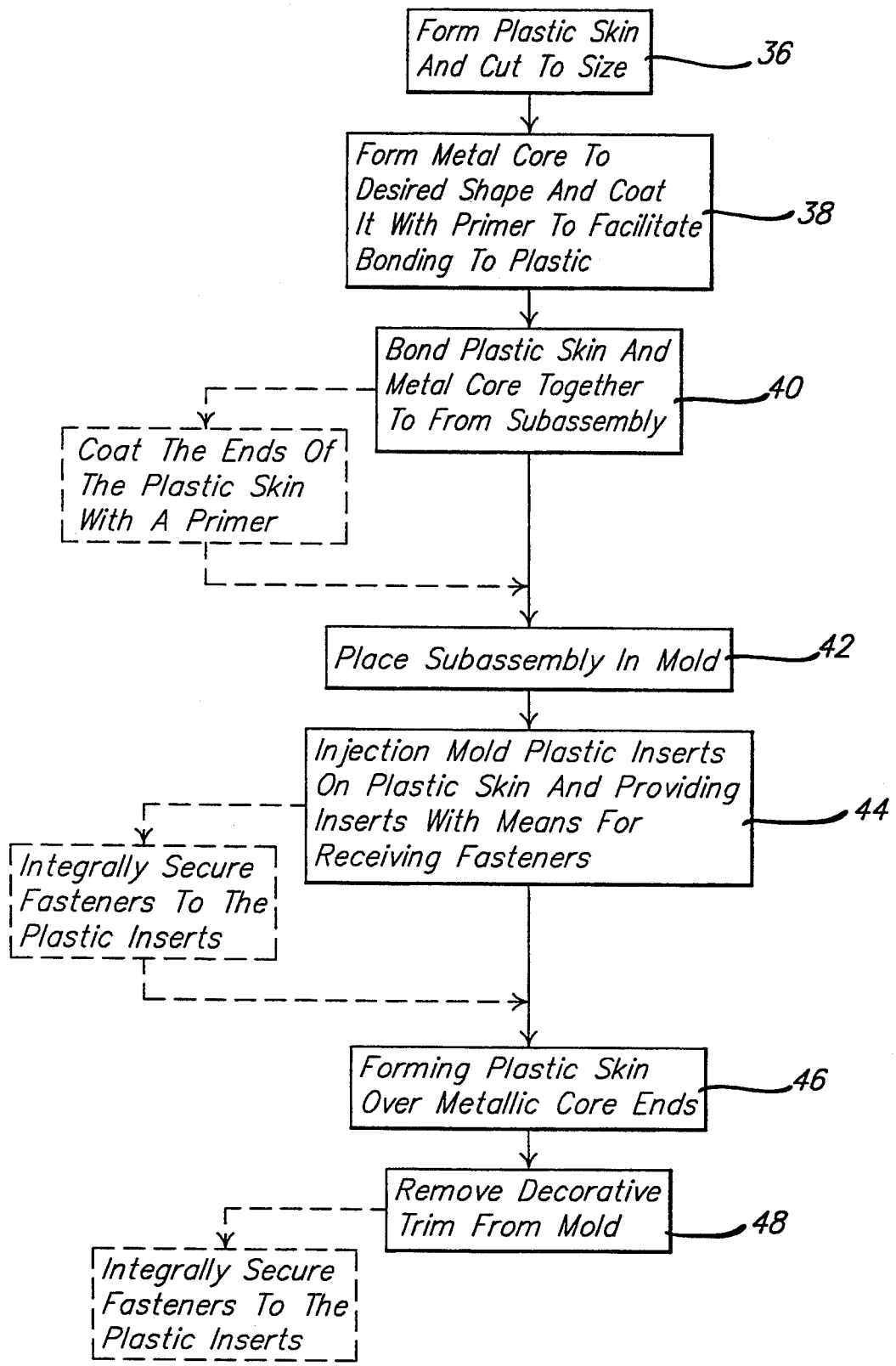
FIG. 4 is a schematic diagram demonstrating the method of manufacturing the decorative trim strip according to the teachings of the present invention.

As outlined in FIG. 4, in accordance with the preferred method of forming the trim strip 10 of this invention, the plastic skin 14 is formed and cut to a predetermined size in a conventional manner as designated by reference numeral 36. The metallic core member 12 is also formed to a desired shape, such as a C-shape in cross-section and a coating such as a primer is generally applied to the metallic core member 12 which is suitable for bonding the plastic skin 14. This step is designated by reference numeral 38 in FIG. 4. The metallic core member 12 and the plastic skin 14 are then brought together as designated by reference numeral 40 and bonded to form a subassembly wherein the plastic skin 14 overlaps the metallic core. The ends 20 and 22 of the plastic skin 14 extend beyond the ends 16 and 18 of the metallic core member 12 to facilitate attachment of the plastic inserts 24 and 26 during the injection molding process. Optionally, the ends 20 and 22 of the plastic skin 14 can be coated with an adhesive promoter to facilitate bonding of the plastic inserts to the plastic skin.

The metallic core 12 and plastic skin 14 subassembly is then loaded into an injection mold as designated by reference numeral 42. Once the metallic core 12 and plastic skin 14 subassembly is securely positioned within the mold cavity, the mold is heated and heated thermoplastic material such as polyvinyl chloride, ABS, or another suitable thermoplastic material is injected under pressure into the mold to thereby form the plastic inserts 24 and 26, this step being designated by reference numeral 44. Upon formation, the plastic inserts 24 and 26 are bonded to the ends 20 and 22 of the plastic outer skin 14. The plastic skin 14, and in particular the end portions 20 and 22 which extend beyond the ends 16 and 18 of the metallic core member 12, are preferably made of a thermoplastic material which softens at the temperature of the injected thermoplastic material used to form the plastic inserts so that materials readily become fused or bonded. The ends 20 and 22 the plastic skin 14 are then formed over the ends 16 and 18 of the metallic core 12 as shown in the step designated by reference numeral 46. As noted, fasteners 30 are preferably integrally embedded with the plastic inserts 24 and 26 during formation of the inserts. The trim strip 10 is then removed from the mold as designated by reference numeral 48 and allowed to fully cure by cooling.

Alternatively, the plastic inserts 24 and 26 are provided with apertures 28 or grooves for hosting fasteners which are attached after the trim strip has been removed from the injection mold. Suitable fasteners typically include metallic or plastic screws, bolts, studs and clips.

Under the method disclosed according to the teachings of the present invention the finished ends of the trim strip 10 are molded in situ, thus simultaneously forming and bonding the end portions of the trim strip 10.

The invention has been described in an illustrative manner, and it is to be understood that the terminology which has been used is intended to describe the invention in a non-limiting manner. The invention as described therefore constitutes the preferred embodiments of the present invention, and it should be appreciated that the invention is susceptible to modification, variation and change without departing from the proper scope and fair meaning of the accompanying claims.

What is claimed is:

1. A trim strip, comprising:
   a metallic core member; and
   a plastic layer bonded to at least one side of said metallic core member, said plastic layer including end portions which extend beyond and at least partially overlap the ends of said metallic core, said end portions including plastic inserts which include means for attaching said trim strip to a substrate.

2. The trim strip according to the teachings of the claim 1, wherein the core member comprises stainless steel or aluminum.

3. The trim strip according to the teachings of claim 1, wherein said means for attaching said trim strip includes fasteners.

4. The trim strip according to the teachings of claim 3, wherein the fasteners are partially embedded within the plastic inserts.

5. The trim strip according to the teachings of the claim 3, wherein said fasteners are selected from a group consisting of screws, bolts, studs and clips.

6. The trim strip according to the teachings of claim 1, wherein the plastic layer is formed as a one-piece continuous member to prevent a joint line from being formed between said core member and said plastic inserts.

7. The trim strip according to the teachings of claim 1, wherein the core member and outer layer have a substantially C-shaped cross-section.

8. A trim strip for attachment to a vehicle, comprising:
   a thin core member;
   an outer layer having a thickness greater than said core member, said outer layer being bonded to at least one side of said core member,
   said outer layer being longer than said core member and including end portions which at least partially overlap the ends of said core member, wherein said end portions include plastic inserts having means for attaching said trim strip to a substrate.

9. The trim strip of claim 8, wherein said core member is metal.

10. The trim strip of claim 8, wherein said outer layer is plastic.

11. The trim strip of claim 8, wherein said means for attaching said trim strip to a substrate includes fasteners.

12. The trim strip of claim 11, wherein said fasteners are at least partially embedded within said plastic inserts.

13. The trim strip of claim 11, wherein said fasteners are selected from a group consisting of screws, bolts, studs and clips.

14. The trim strip of claim 7, wherein said trim strip is C-shaped in cross-section.

* * * * *